Aug. 27, 1968 H. HEYMANN 3,399,395

CHAIN SWITCH

Filed Aug. 13, 1964 3 Sheets-Sheet 1

INVENTOR
Hans Heymann
BY: Toulmin & Toulmin
ATTORNEYS

INVENTOR
Hans Heymann
By: Toulmin & Toulmin
ATTORNEYS

Aug. 27, 1968 H. HEYMANN 3,399,395

CHAIN SWITCH

Filed Aug. 13, 1964 3 Sheets-Sheet 3

INVENTOR
Hans Heymann
BY: Toulmin & Toulmin
ATTORNEYS

United States Patent Office 3,399,395
Patented Aug. 27, 1968

3,399,395
CHAIN SWITCH
Hans Heymann, Wilhelmshaven, Germany, assignor to Olympia Werke AG, Wilhelmshaven, Germany
Filed Aug. 13, 1964, Ser. No. 389,358
Claims priority, application Germany, Aug. 17, 1963, O 9,623
16 Claims. (Cl. 340—147)

ABSTRACT OF THE DISCLOSURE

An electronic chain switch having a plurality of stages, each including a setting input which, upon the application of a signal thereto, enables the respective stage to be switched from quiescent to actuated state, and an actuating input which, upon the application of a signal thereto, switches the respective stage from quiescent to actuated state. The setting inputs are normally connected to a signal source, while the actuating inputs are connected to respective keys of a keyboard. Each stage has an inhibiting element whose output is connected to the setting input of the next succeeding stage such that when any one stage has a signal applied to its actuating input, at least some of the adjacent stages are rendered incapable of being switched from quiescent to actuated state.

Consequently, only one of the stages can at any one time be switched from its quiescent to its actuated state, thereby to prevent the carrying out of a plurality of switching operations caused by the erroneous simultaneous actuations of a plurality of keys. Means are also provided for indicating when signals are being applied to more than one of the actuating inputs at any one time.

The present invention relates to electronic chain switches with individually controlled switching steps or stages and with each stage having an output. More particularly still, the present invention relates to a selective chain switch in which a certain "preferred" switching condition hereinafter referred to as the "actuated state" can be assumed in only one of the switching stages at any one time. Electronic chain switching arrangements of this type are widely used in data processing systems as input circuits connected to keyboards.

Known circuits of this kind, so far as they operate mechanically, comprise locking devices whereby when one switch is actuated, all the others will be held firmly in their initial positions. Furthermore, with electronic chain switches a connection of the individual switching stages through logical switching members is conceivable by requiring each reswitching signal for a stage to pass through an AND gate which, besides providing the signal input path, also provides for every preceding stage of the chain, a settable input negatively associated with the actuated state. The number of settable inputs in this case becomes one greater for each succeeding stage. The previously suggested solutions are inapplicable for this purpose because of their mechanical method of functioning or because of their disproportional switching requirements with increased numbers of stages.

The purpose of this invention is on the other hand to provide an electronic selective chain switch of the kind mentioned above, all of whose switching stages are constituted in the same manner. Furthermore, the circuit must not only prevent a simultaneous disconnection of several switching stages, but on occasions must also indicate by a corresponding signal the occurrence of a control command which is contrary to the prescribed selection pattern. The latter requirement is especially important when it is not immediately apparent which of a plurality of several simultaneous command signals is to be effective as when the signal that was suppressed by the selection circuit is actually the desired one, while the signal that was passed on was an erroneous one.

The method used by this invention for solving that problem is characterized by the presence in each complete stage of the chain of an input for establishing the actuated state, said input being connected to the next succeeding stage when the preferred circuit is not energized. In this manner all complete circuit stages, namely, all stages except the first and the last, are similarly constituted, and transmit the circuit state from the preceding stages and also their own circuit state to the succeeding stages.

A generally equivalent solution of the problem, and one that is based on the same principles, is characterized essentially by the presence, in each next following stage, of an advancing input in addition to the input of the preferred circuit when the latter is not energized, the advancing input being connected to a corresponding unenergized input of the next following stage. Also in the solution of the problem each switching stage transmits to the next following stage the required circuit states that were taken from the preceding stage and which depend on its own circuit, so that in spite of the structural similarity of all stages, the circuit states of each stage are dependent on those of the preceding stages for the establishment of the required circuit states. The last-mentioned circuit has generally the advantage of requiring only inexpensive circuit elements where suitable bistable elements such as flip-flops or the like are readily available, and which have complementary inputs and outputs between them. All forms of this invention have in common the feature that when a plurality of circuit stages are energized a signal is obtained from a preceding stage for controlling the subsequent stages of the chain.

Other features and advantages of this invention will be learned from the following description of specific examples which are illustrated on the drawings, in which.

Figure 1:
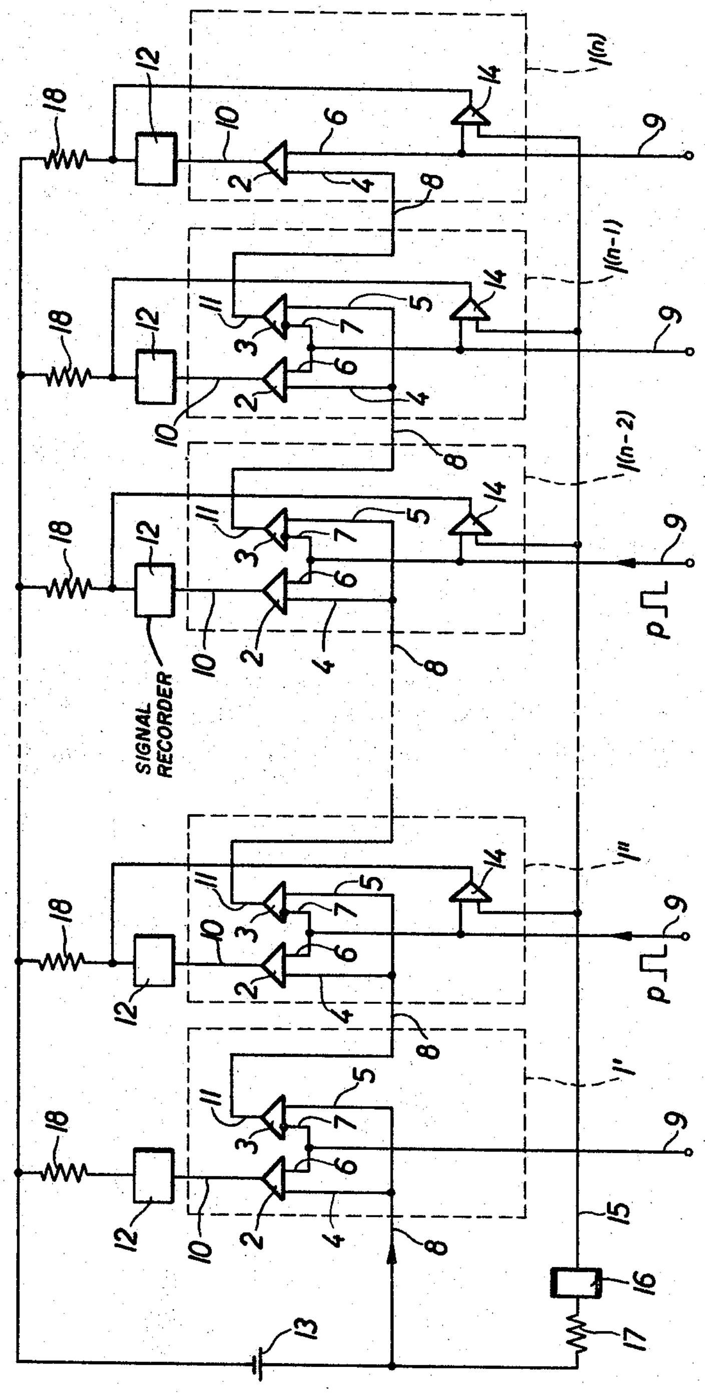
FIGURE 1 shows a first example of a chain switch circuit according to this invention.

The chain switching circuit of FIGURE 1 consists of switching stages 1' to $1^{(n)}$ which consist essentially of two AND gates 2, 3 in parallel at the input side. The only deviation therefrom is in the last switching stage $1^{(n)}$ where only one AND gate 2 is present. This is readily explained by the end position of stage $1^{(n)}$.

All AND gates 2 are provided with two normal inputs 4 and 6 while each AND gate 3 has a normal input 5 and an inhibit input 7. Inputs 4 and 5 are connected together, as are inputs 6 and 7 and while in combination they form an input 8 which upon the application of a signal thereto, prepares or "sets" the stage so as to enable it to be switched from quiescent to actuated state and an input 9 which, upon the application of a signal thereto, switches the stage from quiescent to actuated state, provided of course a signal is applied to input 8 as well. Thus the outputs 10 and 11 of the two AND gates 2, 3 therewith the outputs 10 and 11 of the two AND gates 2, 3 are in normal or inhibited relation to the actuated state. Every output 10 is also connected to its own signal recorder 12 as a load, while every output 11 is connected to the setting input 8 of the subsequent step.

The present example relates to a DC logic circuit. Accordingly, the inputs 4 and 5 will be galvanically connected with the outputs 10 or 11 when corresponding setting signals do or do not occur at the inputs 6 and 7. The inputs 6 and 7 are energized through their respective inputs 9 (as indicated in stages 1″ to $1^{(n-2)}$) with switching impulses *p* and can at the same time be disconnected from the DC circuit which is energized by a source of electric current 13 one terminal of which is connected to the first input 8 and the other terminal of which is connected to the output of all the loads 12.

All stages except the first are also provided with an AND gate 14 with two normal inputs, one of which is connected to its associated input 9 while the other is connected with a bus or collecting circuit 15 leading to a control relay 16 which is connected through a resistor 17 to the input 8 of the first stage.

While the system is at rest, none of the inputs 9 are actuated so that the inputs 8 (connected in series through the AND gates 3) and the outputs 11, up to the last stage, form an uninterrupted DC path. If one of the inputs 9, e.g., that of stage $1^{(n-2)}$, is energized by a switching impulse *p*, then in this stage the previously open AND gate 2 will be closed to render said gate 2 conducting while the previously conducting AND gate 3 will be opened. The DC path will thereby be broken in the AND gate 3 of that stage, while the output 10 of this stage with the load 12 will be brought into the path of the DC source 13 in which condition the circuit will remain as long as the impulse *p* continues. The latter will also prime or set the AND gate 14 of the energized step $1^{(n-2)}$ for thorough conduction. No signal is received at the second input of gate 14 which is connected to the collecting circuit 15, because the closed current path from the input 8 of the first stage (1′) up to the stage $1^{(n-2)}$ and from there through the load 12 of this stage to the current source 13 is parallel to the current path from the relay 16, resistor 17 and the AND gate 14 in stage $1^{(n-2)}$ and is practically short circuited by the latter because of the low resistance of the resistor 17. In any event, the current division between these two parallel circuits can be so adjusted by the selection of a suitable value for resistor 17 so that relay 16 will not be actuated. A necessary prerequisite therefor would be, firstly, a sufficiently low internal resistance of the load 12, and, secondly, that the sum of the current through the AND gate 2 and the load 12 and the current through the AND gate 14 of the energized stage be independent of the load, within certain limits. In every stage this is accomplished by assigning a suitable value to the resistor 18.

It is now assumed that at the same time when stage $1^{(n-2)}$ is switched into its actuated state, one of the preceding stages, e.g., stage 1″, will also be energized. The AND gate 3 in stage 1″ will thereby be thrown into blocking or open condition to interrupt the flow of current to input 8 of the next following stage and hence also to the stage $1^{(n-2)}$. The load 12 of the last-named stage ($1^{(n-2)}$) is then immediately without current. It will then be possible, as required, to energize only one of the stages of the chain. When a plurality of stages are energized simultaneously, the stages which are closest to the beginning of the chain will take the lead.

While the circuit described so far will, to be sure, prevent more than one stage from being actuated at any one time, there is as yet no guarantee that the correct signal will be switched through because the selection criterion of the circuit depends only on the sequence of the stages in the chain. In the event of a double or multiple actuation it is therefore necessary that there also be given a control signal. This purpose is then served by the AND gate 14 of the stage or stages that were excluded by the selection system, e.g., also by the stage $1^{(n-2)}$. With the interruption of the flow of current at the input 8 of stage $1^{(n-2)}$, the associated AND gate 2 is blocked or open and the low resistance bridging of the AND gate 14 by the load 12 is therefore also interrupted. Parallel to the AND gate 14 in stage $1^{(n-2)}$ and to relay 16 with resistor 17, there is now the current path from input 8 of stage 1′ over the AND circuit 2 in the first energized stage 1″ and its load 12 to the associated resistor 18. With series resistors 17 and 18 of suitable values, both of these parallel current paths will have total resistances of the same order of magnitude and will therefore conduct corresponding currents so that relay 16 will now respond and give the desired signal for the reception of a plurality of control impulses. Because of the voltage drop at the series resistor 17 and relay 16, the output from the AND gate 14 in stage 1″ will be at a higher potential than the collecting conductor 15 and will therefore remain blocked.

When the energizing of stage $1^{(n-2)}$ is discontinued, the voltage drop at the series resistor 17 will also be eliminated, but relay 16 remains bridged over by the low resistance of the circuit from input 8 in stage 1′ over the AND gates 3 and 2 in stage 1″ as well as over the load 12, and therefore drops out by being deenergized. The AND gates 14 should then be proportioned in such a manner that they will on occasion not respond at all when energized by only weak currents, and thereby completely interrupt the current path through relay 16.

If, in another case, an impulse *p* appears, for instance, first at stage 1″, a pulse is applied to the load 12 of that stage, while at the same time the DC energization for all subsequent stages is interrupted, by way of output 11. If, then, a further impulse *p* is applied to one of these subsequent stages, such stage can not pass on a pulse to its respective load, so that the desired selection criterion has been maintained. It will be noted, of course, that the AND gate of the stage which has had the second impulse *p* applied to it, will, due to this second impulse, become conductive, so that in this case, too, the control relay 16 will be energized.

Figure 2:
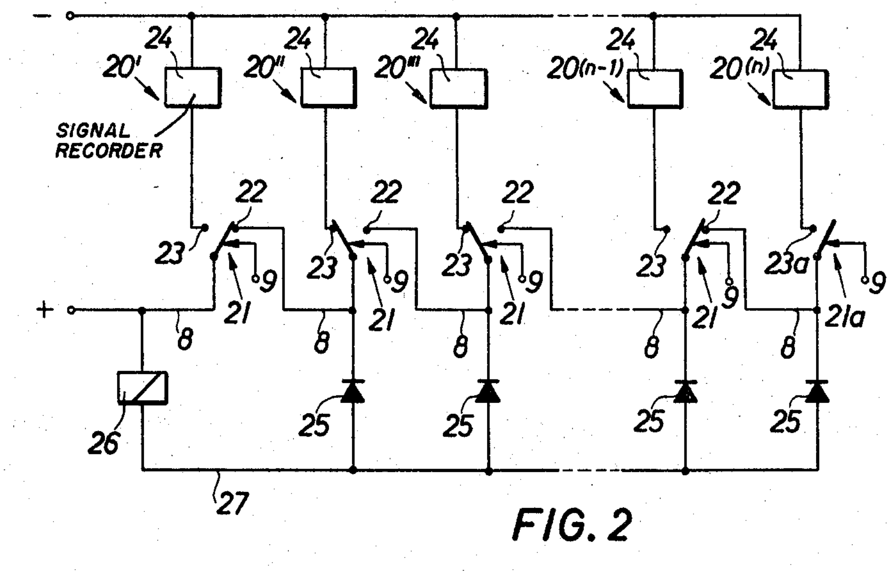
FIGURE 2 shows a modification of the circuit shown in FIGURE 1.

The circuit in FIGURE 2 is distinguished from that of FIGURE 1 by certain simplifications. Also instead of the symbolically indicated circuit elements, special circuit elements are introduced. There is shown here a DC circuit which has the terminal marked + and — connected to a suitable source of current, the internal resistance of which is of no consequence. The chain stages 20′, 20″ . . . $20^{(n-1)}$, include double throw switches 21, whose quiescent contacts 22 are connected in each case to a terminal of an adjacent stage. The last stage $20^{(n)}$ includes a simple switch 21*a*. The switches 21′, 21*a*, have working contacts 23, 23*a*, as shown. The switches can be actuated in any desired manner.

In the initial setting the switch contacts are all connected with the corresponding fixed contacts 22 of stages 20′ to $20^{(n-1)}$ in series and are connected through the plus terminal with the source of current. The oppositely positioned fixed contacts 23 of stages 20′ to $20^{(n)}$ are each connected to a respective signal recorder 24 as a load. The switches 21 of stages 20″ to $20^{(n)}$ have diodes 25 connected to their cathode sides, the anode sides of the diodes being connected to a collector conductor 27 leading to a control relay 26 the other side of which is connected to a positive input terminal.

In FIGURE 2 the switches 21 of stages 20″ and 20‴ are shown in their actuated states, namely, in circuit with the respective fixed contacts 23. This double actuation however leads only to an application of the full supply voltage at the load 24 of stage 20″ because the free fixed contact 22 of this stage interrupts any direct connection of the positive input terminal with the load 24 of stage 20‴. Here also, of a plurality of simultaneously energized switches, the one that is closest to the beginning of the chain will be actuated ahead of the others. The diodes of stages 20″ and 20‴ will then prevent a short circuiting at the switch causing the interruption.

With the actuation of only one switch, no current will flow through the relay 26 because the latter will be short circuited by the connections between the positive input terminal and the switch contacts. If the switch 21 of stage 20″ is the only actuated switch, the relay 26 and the diode of stage 20″ will be short circuited through the switch 21 of this stage which is set in the resting position or quiescent state. If now, however, a second switch, e.g., that of stage 20‴ is actuated, then the potential of the collection circuit 27 which is connected to the diodes will drop because of the division of potential between relay 26 and load 24‴ of stage 20‴ when the diode of this stage is opened under the potential at the switch 21 of stage 20″. The diode of stage 20″ is thereby blocked and the short circuit of the relay 26 discontinued so that said relay will be actuated by a weak current through the load of stage 20‴. At the same time the load which is associated with the second actuated switch will not be left entirely without current as would be the case in the circuit of FIGURE 1.

Figure 3:
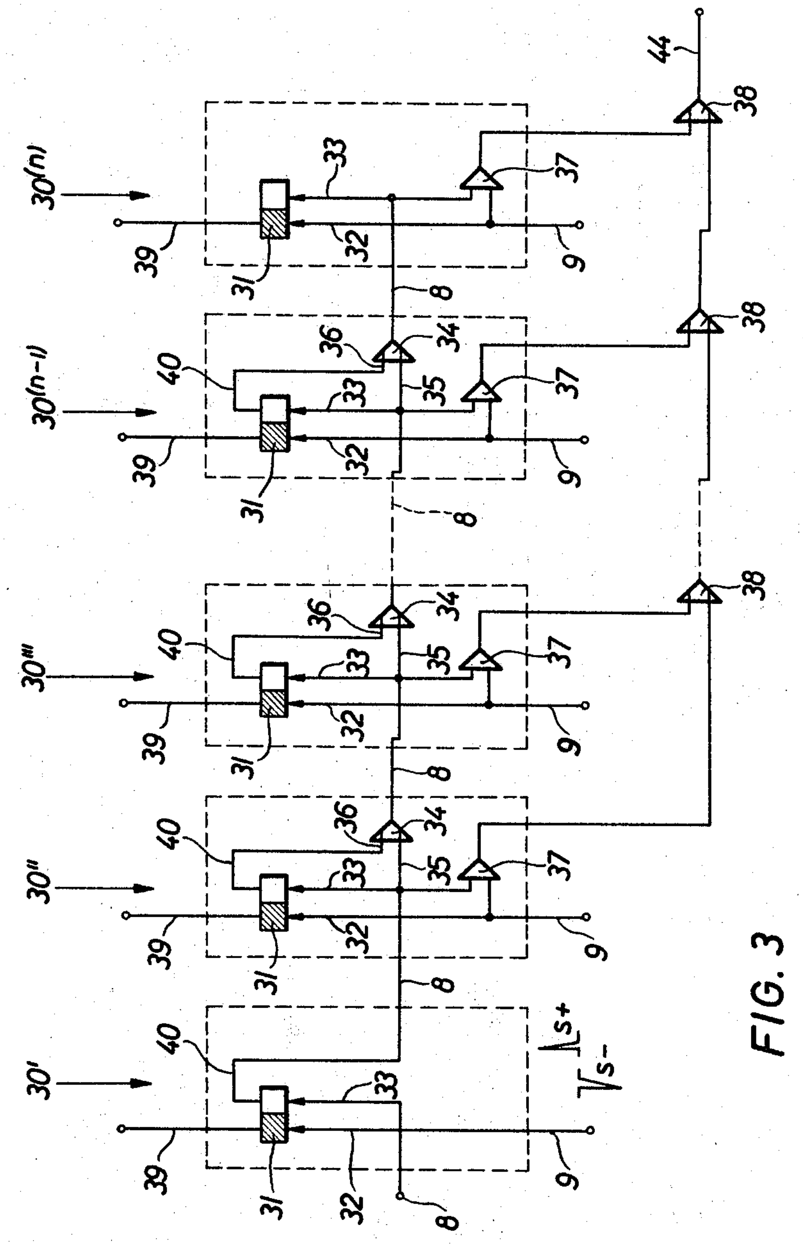
FIGURE 3 shows a chain switching circuit based on a related principle.

The method of operation of the chain switch of FIGURE 3, the stages of which are similarly to the embodiments of FIGURES 1 and 2, rests likewise on the principle of a stage operating according to its own setting and transmitting a signal to the next succeeding stage to provide the switching criterion that was taken over from the preceding stage. In this case however the preparation for the assumption of the actuated state is made dependent on the presence of a signal directed to the opposite switching condition on the side of the preceding stages. A signal from any preceding stage and directed to the actuated state setting whereby said stage will provide an output on output 39 will rather effect a blocking of the actuated state at the input of any actuated stage further ahead.

The switching stages 30′ to 30$^{(n)}$ consist essentially of bistable elements 31, each having two control inputs 32 and 33 and two correlated outputs 39 and 40. The input 32 is normal for the actuated state of each stage, while the input 33 is inhibited in advance. The inhibited input of each stage 30‴ to 30$^{(n)}$ is provided by a blocking signal from the output of an OR gate 34 of the preceding stage and transfers this to an input 35 of the associated OR gate 34 of the next following stage. The second inputs 36 of the OR gates 34 are connected with an output 40 of the associated bistable element 31 directed away from its preferred side, and thus effects the necessary completion of the switching criterion depending on the condition of the corresponding stage. Modified constructions are used in the first and last stages of the chain, as are obviously required by the conditions at the ends of the chain.

Both control inputs of the bistable element 31 are connected each with an input of an AND gate 37 whose outputs are brought together in pairs over additional OR gates 38 and connected in series. From the output 44 of the last OR gate 38 a control signal is delivered to the inputs 32 for multiple control of the stages.

The signal receivers which are to be chosen are not shown in FIGURE 3. They can be connected in the usual manner to the outputs 39.

In this case, the inputs 32 receive AC impulses, and in such a manner that a positive switching impulse $s_+$ produces the actuated state whereas a negative switching impulse $s_-$ returns the circuit to its original setting, or quiescent state. Control pulses of both kinds are therefore to be applied to the inputs 32 by a suitable impulse generator. On the other hand, the bistable elements 31 deliver from their normal outputs 39 and from their inhibit outputs 40 different DC voltages. Also the inputs 33 are supplied with DC voltage, suitable for their connection to the outputs 40.

Figure 4:
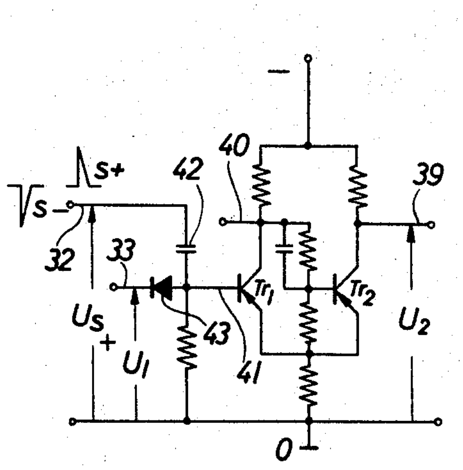
FIGURE 4 shows a bistable (flip-flop) switch suitable for use in the circuit of FIGURE 3.
Figure 5:
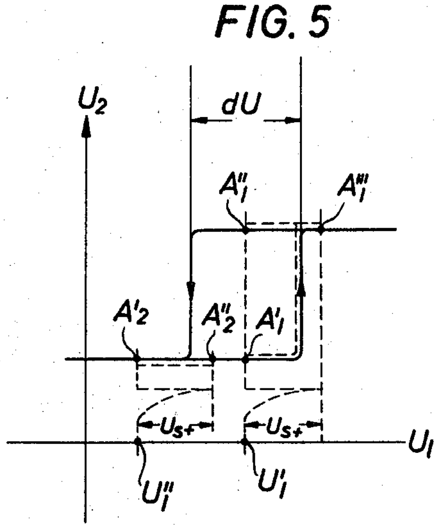
FIGURE 5 shows the method of operation of the switching stage of FIGURE 4 with a characteristic control line.

For a more detailed disclosure of the method of operation of the bistable elements, FIGURES 4 and 5 are referred to. In FIGURE 4 is shown a customary form of Schmitt-trigger as the bistable element with a transistor circuit. The base of the first transistor $Tr_1$ is connected to a DC control voltage input 33 and an impulse input 32. A condenser 42 isolates the DC from the input 32. In order to keep the impulses applied at input 32 from reaching the remaining stages, a decoupling diode 43 is included in the input 33.

In the actuated state of this stage, which is established by a positive switching impulse $S_+$ at the input 32, the transistor $Tr_2$ becomes conducting while the transistor $Tr_1$ is blocked. The output 39 which is normally directed to the actuated state side will be at a higher potential during such state than the output 40 which is inhibited toward the actuated circuit. The opposite is true when the bistable element, in its quiescent state, is directed by a negative switching impulse $s_-$ at the input 32. The relatively positive directions of the impulse voltage $U_{s+}$ at the input 32, as well as DC voltages $U_1$ and $U_2$ at the input 33 and at the output 39, are represented in FIGURE 4 by arrows.

The preparatory action of the DC input 33 is apparent from the diagram in FIGURE 5 which shows the output voltage $U_2$ dependent on the input voltage $U_1$, possibly with the superimposed impulse voltage $U_{s+}$ or $U_{s-}$. The Schmitt-trigger which is here used as the bistable element shows in this characteristic line a hysteresis curve of width $dU$, the inside of which functions as a bistable flipflop. If a quiescent voltage of e.g., $U'_1$ is applied at the input 33, the trigger can remain in working position $A'_1$ or $A''_1$. Transistors from one of these working positions to the other are then effected by positive or negative switching impulses at the input 32. In the characteristic curve is shown an impulse voltage $U_{s+}$ proceeding e.g., from the resting voltage $I'_1$ upwardly from the working point $A'_1$ and over the arising hysteresis branch up to the point $A''_1$ on the characteristic curve, the trigger returning, after disappearance of the impulse voltage, to the working position $A''_1$. From the resting voltage $U''_1$ thus established at the input 33, a superimposed impulse voltage $U_{s+}$ leads only from the working point $A'_2$ to the point $A''_2$ on the characteristic curve and leaves the trigger unchanged in its original working position. The voltage changes at the output 40 relative to the input voltage are similar to those at the output 39, but with the polarity jumps reversed.

In FIGURE 3 the control input 33 of each chain stage from the second 30″ to the last step 30$^{(n)}$ is connected to the output 40 of the preceding stage. Hence in the actuated state of the trigger the potential at the output 40 will be less than at the output 39 ($Tr_1$ being blocked and $Tr_2$ open) which will bring the trigger of the next following switching stage into its working position $A'_2$. Starting from this working position it is no longer possible to pass into the actuated state in response to subsequent positive impulses. All other stages are controlled from the first one. In this manner the required switching criterion is satisfied.

With the help of the last-mentioned through switching across the OR gates 34 and by means of the AND gates 37, the desired control signal for multiple controlling is produced. After any single chain stage has been actuated, a setting signal will appear at the output of all the subsequent OR gates 34 as well as at the inputs of the AND gates 37 connected therewith. When at least two stages are simultaneously actuated across their inputs 32, the AND gaes 37 of both inputs are thereby energized and opened to provide a signal across the OR gates 38 to the output 44.

It will be understood that this invention is susceptible to modification in order to adapt it to different usages and conditions; and accordingly, it is desired to comprehend such modifications within this invention as may fall within the scope of the appended claims.

What is claimed is:

1. An electronic chain switch comprising, in combination:

(a) $n$ ($n$ = 2, 3, 4 . . .) stages each of which is switchable between a quiescent state and an actuated state, each stage having:

(1) setting input means, effective upon the application of a signal thereto, for enabling the respective stage to be switched from quiescent to actuated state, said setting input means being connected to a signal applying means at least when the respective stage is in quiescent state, (2) actuating input means, effective upon the application of a signal thereto, for switching the respective stage from quiescent to actuated state, the actuating input means of all of said stages being connectible to respective keys of a keyboard, (3) inhibiting means connected to said two input means and itself having an output connected to the setting input means of the next succeeding stage for rendering at least some of the adjacent stages incapable of being switched from quiescent to actuated state upon the application of a signal to said actuating input means, in consequence of which only one of said stages can at any one time be switched from its quiescent to its actuated state thereby to prevent the carrying out of a plurality of switching operations caused by the erroneous simultaneous actuations of a plurality of the keys; and (b) means connected to said stages for indicating when signals are applied to more than one of said actuating input means at any one time.

2. An electronic chain switch as defined in claim 1, wherein each of the first through the $(n-1)^{th}$ stages comprises a first AND gate having two normal inputs and a second AND gate having a normal input and an inhibit input, one input of said first AND gate and said normal input of said second AND gate being connected to form part of said setting input means and the other input of said first AND gate and said inhibit input of said second AND gate being connected to form part of said actuating input means.

3. An electronic chain switch as defined in claim 2, wherein, in each stage, the output of said first AND gate is connected via a load and a resistor to one terminal of a voltage source, the other terminal of said voltage source being connected to the setting input means of the first stage, the output of each respective stage being constituted by the output of the respective second AND gate.

4. An electronic chain switch as defined in claim 3 wherein the $n^{th}$ stage comprises a single AND gate having two normal inputs connected to form, respectively, part of said setting input means and part of said actuating input means.

5. An electronic chain switch as defined in claim 4, wherein each of the second through the $n^{th}$ stages further comprises a third AND gate having two normal inputs one of which is connected to form part of said actuating input means and the other of which is connected to a collector, the latter being connected via a relay forming part of said indicating means and via a resistor to said other terminal of said voltage source.

6. An electronic chain switch as defined in claim 5, wherein, in each stage, the output of said third AND gate is connected to the junction of the load and of said resistor connected thereto.

7. An electronic chain switch as defined in claim 1, wherein each of the first through the $(n-1)^{th}$ stages comprises a two-pole switch including a switch element movable between quiescent and actuated positions wherein it makes contact with quiescent and working contacts, respectively, said movable switch element being connected to form part of said setting input means and being operatively associated with said actuating input means to be actuated thereby.

8. An electronic chain switch as defined in claim 7, wherein the $n^{th}$ stage comprises a switch including a switch element movable between quiescent and actuated positions, said movable switch element being connected to form part of said setting input means and, in its actuated position, making contact with a working contact, said movable switch element being operatively associated with said actuating input means to be actuated thereby.

9. An electronic chain switch as defined in claim 8, wherein the working contact of each stage is connected, via a respective load, to one terminal of a voltage source whose other terminal is connected to the setting input means of the first stage, and wherein the quiescent conwherein, in each of the second through the $n^{th}$ stages, connected to the setting input means of the next succeeding stage.

10. An electronic chain switch as defined in claim 9, wherein, in each of the second through the $n^{th}$ stages the movable switch element is connected, via a respective diode, to one terminal of a control element forming part of said indicating means, the other terminal of said control element being connected to said other terminal of said voltage source.

11. An electronic chain switch as defined in claim 1, wherein each stage comprises a bistable flip-flop having first and second inputs and correlated first and second outputs, the first input being connected to form part of said setting input means and said second input being connected to form part of said actuating input means.

12. An electronic chain switch as defined in claim 11, wherein, in each of the first through the $(n-1)^{th}$ stages said first output is connected to the setting input means of the next succeeding stage and said second output is connected to a load.

13. An electronic chain switch as defined in claim 12, wherein each of the second through the $(n-1)^{th}$ stages further comprises an OR gate whose inputs are connected respectively, to the first input and to the first output of the flip-flop of the respective stage, and whose output is connected to the setting input means of the next succeeding stage.

14. An electronic chain switch as defined in claim 13, wherein each of the second through the $n^{th}$ stages further comprises an AND gate whose inputs are connected, respectively, to the two input means of the respective stage and whose output is connected via OR gate means to a part of said indicating means.

15. An electronic chain switch as defined in claim 11, wherein said second inputs of said flip-flop are coupled to receive AC pulses as well as negative and positive pulses.

16. An electronic chain switch as defined in claim 1, wherein each stage comprises a bistable feed-back circuit having a hysteresis characteristic, the quiescent state of each stage being settable by means of said setting input means to two different points on the characteristic, one of said points lying in approximately the middle of the hysteresis and the other being a point at which the stage is prevented from assuming its actuated state.

References Cited

UNITED STATES PATENTS

| | | | |
|---|---|---|---|
| 2,935,627 | 5/1960 | Schneider | 340—147 |
| 3,177,409 | 4/1965 | De Kroes et al. | 340—147 |

JOHN W. CALDWELL, *Primary Examiner.*

DONALD J. YUSKO, *Assistant Examiner.*